US006938868B2

(12) United States Patent
Pence

(10) Patent No.: US 6,938,868 B2
(45) Date of Patent: Sep. 6, 2005

(54) METHOD AND APPARATUS FOR SUPPORTING A THIN, RIGID PANEL

(76) Inventor: Charles Pence, 1618 Caplin Dr., Arlington, TX (US) 76018

(*) Notice: Subject to any disclaimer, the term of this patent is extended or adjusted under 35 U.S.C. 154(b) by 0 days.

(21) Appl. No.: 10/696,448

(22) Filed: Oct. 29, 2003

(65) Prior Publication Data

US 2005/0092889 A1 May 5, 2005

(51) Int. Cl.[7] ............................................. A47K 3/30
(52) U.S. Cl. ........................... 248/354.3; 4/600; 4/612; 4/614; 16/DIG. 24; 403/187; 403/230; 403/256
(58) Field of Search .......................... 248/351, 354.1, 248/354.3; 4/600, 607, 612, 614; 403/187, 403/230, 235, 256, 257, 258, 259, 260, 261, 403/262, 263; 16/DIG. 24, DIG. 40

(56) References Cited

U.S. PATENT DOCUMENTS

| | | | | | |
|---|---|---|---|---|---|
| 2,004,462 | A | * | 6/1935 | Bush | 249/42 |
| 4,366,910 | A | * | 1/1983 | Uccello et al. | 211/191 |
| 4,872,634 | A | * | 10/1989 | Gillaspy et al. | 248/354.3 |
| 4,900,058 | A | * | 2/1990 | Hobrecht | 280/756 |
| 4,914,770 | A | | 4/1990 | Baus | 4/612 |
| 4,987,619 | A | * | 1/1991 | Smith | 4/612 |
| 5,050,252 | A | * | 9/1991 | Cuttriss | 4/576.1 |
| 5,065,462 | A | * | 11/1991 | Romano | 4/604 |
| 5,642,959 | A | | 7/1997 | Greferath | 403/388 |
| 5,671,489 | A | * | 9/1997 | Salach | 4/614 |
| 5,690,237 | A | * | 11/1997 | Marzec | 211/105.1 |
| 6,250,044 | B1 | * | 6/2001 | Funk et al. | 52/782.1 |
| 6,363,547 | B1 | | 4/2002 | Perry | 4/614 |
| 6,415,462 | B1 | | 7/2002 | Perry | 4/614 |
| 2004/0135054 | A1 | * | 7/2004 | De Leon | 248/475.1 |

FOREIGN PATENT DOCUMENTS

FR 2612577 A1 * 9/1988
GB 2185798 A * 7/1987

* cited by examiner

Primary Examiner—Jonathon Szumny
(74) Attorney, Agent, or Firm—Charles D. Gunter, Jr.

(57) ABSTRACT

A support arm apparatus and method for stabilizing an outward, distal portion of a thin, rigid panel attached at an inward, vertical edge opposite the outward, distal portion to a fixed vertical surface, comprising a support bar having externally threaded first and second ends and formed at an elbow angle nearer the first end; a first mounting assembly installed on the first end of the support bar for attaching the first end of the support bar to the thin panel at a first location thereon; and a second mounting assembly installed on the second end of the support bar for attaching the second end of the support bar to the fixed vertical surface at a second location thereon; wherein the externally threaded first and second ends of the support bar enable adjustment of the first and second mounting assemblies respectively along a longitudinal axis of each first and second end of the support bar to stabilize the outward, distal portion of the thin panel at a predetermined panel angle.

8 Claims, 4 Drawing Sheets

METHOD AND APPARATUS FOR SUPPORTING A THIN, RIGID PANEL

BACKGROUND OF THE INVENTION

1. Field of the Invention

The present invention generally relates to supporting thin, rigid panels and, more particularly, to a method and apparatus for supporting and stabilizing glass panels in applications such as shower stalls and the like.

2. Description of the Prior Art

Shower stalls having glass walls and doors have become more popular in recent years. Typically, a shower stall having one or more fixed glass wall panels and a hinged glass door panel requires additional support to stabilize the edge of the fixed glass panel(s) opposite the edge that is attached to the wallboard or masonry wall of the room containing the shower stall. One prior art solution for providing the added support is disclosed in U.S. Pat. No. 4,914,770, issued to Baus, wherein a molded or cast crosspiece having vertical mounting surfaces at right angles to each other at the respective ends of the crosspiece is provided. One end of the crosspiece is secured to a stationary wall and the other end is secured to the transparent panel to be supported. Elongated holes are provided in the mounting surfaces of the crosspiece to permit rotating the crosspiece on the stationary wall or to permit lateral adjustment of the transparent panel toward or away from the stationary wall. U.S. Pat. No. 5,642,959, Geferath, discloses support rails that bridge the gap between panels being coupled together at their edges, either at an angle or edge-to-edge in a common plane. The support rails are attached to the panels by bearing elements clamped to each side of the panel through a hole in the panel. In one embodiment, support rail halves include a pivot joint enabling the pair of rails to function like a hinge. U.S. Pat. Nos. 6,363,547 and 6,415,462, both issued to Perry, disclose angle brackets constructed of transparent material for fastening glass panels together or to support the panels on a stationary wall.

Of the prior art discussed herein above, only Baus provides a device that is able to support the edge of the glass panel that is away, or distal, from the stationary wall upon which the glass panel is mounted. However, the crosspiece of Baus does not permit the position of the glass panel being supported to be adjusted linearly in directions both parallel to the stationary wall and toward or away from the wall. Further, the crosspiece is utilitarian in appearance and resembles a structural member rather than an article having a smooth, decorative appearance that is suitable for a residential bathroom. Further, Baus' crosspiece is relatively expensive to manufacture, requiring molds or dies to fabricate the cast or molded crosspiece. What is needed is an apparatus and method of supporting a glass or other thin, rigid panel at an outward or distal portion which overcomes the deficiencies of the prior art.

SUMMARY OF THE INVENTION

A support arm apparatus and method is disclosed for stabilizing an outward, distal portion of a thin, rigid panel. The thin, rigid panel, such as a glass panel, is attached at an inward, mounted edge, opposite the outward, distal portion, to a fixed, mounting surface, such as a masonry wall. The support arm assembly comprises a utility glass support bar having externally threaded first and second ends and bent or formed at an elbow angle nearer the first end; a first mounting assembly installed on the first end of the support bar for attaching the first end of the support bar to the thin panel at a first location thereon; and a second mounting assembly installed on the second end of the support bar for attaching the second end of the support bar to the fixed, mounting surface at a second location thereon; wherein the externally threaded first and second ends of the support bar enable adjustment of the first and second mounting assemblies respectively along a longitudinal axis of each first and second end of the support bar to stabilize the outward, distal portion of the thin panel at a predetermined panel angle.

DETAILED DESCRIPTION OF THE INVENTION

Figure 1:
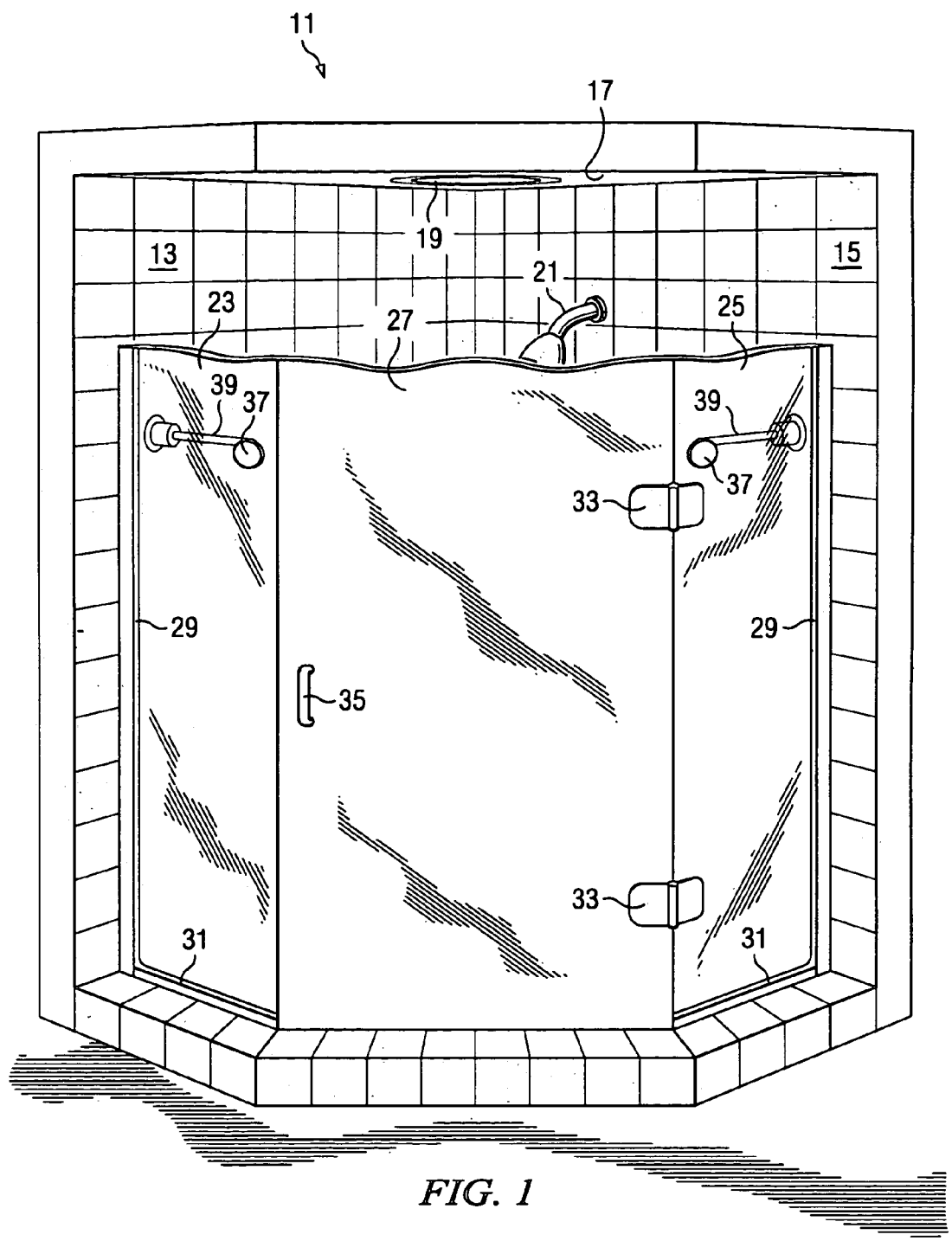
FIG. 1 illustrates a perspective view of an illustrative shower stall enclosure with glass panels supported and stabilized according to the present invention.

Referring to FIG. 1, there is illustrated a perspective view of an illustrative shower stall enclosure with glass panels supported and stabilized according to the present invention. A shower stall 11 includes first and second adjoining walls 13, 15 and a ceiling 17 forming a corner into which the shower stall 11 is constructed. A lamp 19 is mounted in the ceiling 17. A shower head 21 is mounted on the upper portion of the wall 15. A left glass panel 23 is attached to the wall 13 by a side frame 29 and a bottom frame 31. Similarly, a right glass panel 25 is attached to the wall 15 by a side frame 29 and a bottom frame 31. A glass panel door 27 is supported on upper and lower hinges 33 and a door latch 35. Both left and right glass panels 23 and 25 are supported and stabilized by the support bar assemblies 39 (shown in phantom views through the glass panels 23, 25) attached to the glass panels 23, 25 and the vertical surfaces of the walls 13, 15, to be described in detail herein below. Also shown in the figure are outside caps 37, which secure the support bar assemblies 39 to the glass panels.

In operation, the support bar assemblies 39, as shown in FIG. 1, provide support and stability to the outward (distal) or otherwise unsupported portions of the glass panels 23, 25. This support enables the glass panels to withstand the shifting loads presented to them when the panels are bumped from either side or the door 27 is opened and closed and latched. Further, the support bar assemblies 39 are adjustable to enable positioning the glass panels with respect to the walls 13, 15 along two axes—parallel to the walls 13, 15 and toward or away from the walls 13, 15. This adjustment capability enables proper alignment of the glass panels and the adjustment of the glass panels for a minimum of stress or distortion of the panels.

Figure 2:
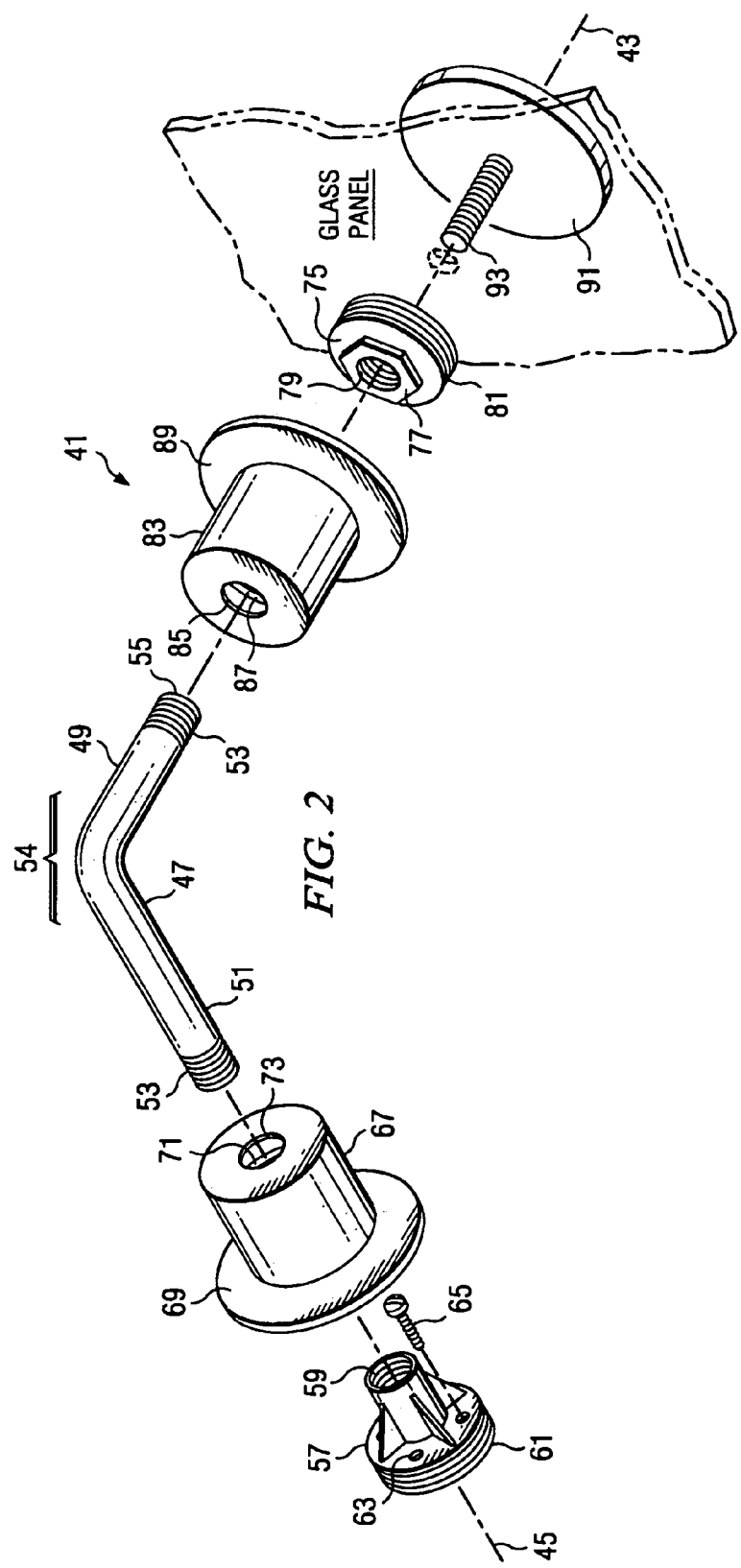
FIG. 2 illustrates an exploded view of one embodiment of the support bar assembly according to the present invention.

Referring to FIG. 2, there is illustrated an exploded view of one embodiment of the support bar assembly according to the present invention. In the description which follows, parts or elements bearing the same reference numbers in more than one drawing are alike. The individual components of the support bar assembly 41 are shown arranged in the order of assembly and along the longitudinal axes 43, 45 of the first arm 49 and the second arm 51 respectively of the support bar 47. The support bar 47 has external threads 53 on each end of each first and second arms 49, 51 respectively. For economy in manufacture, the threads 53 may be the same pitch, diameters and length at both ends of the first and second arms 49, 51 of the support bar 47. The support bar 47 may be fabricated of metal or plastic, solid or hollow stock, by any suitable mass-production process. Alternatively, the support bar is easily fabricated for custom installations. When assembled, the support bar assembly of the present invention provides a sturdy support for the glass panels and presents a smooth, pleasing appearance that is complementary to the decor of the application site.

An elbow angle is formed in the support bar in the first arm, nearer the first end, at location 54 along the support bar 47 in the illustrative embodiment. In most installations, the elbow angle formed will be about 90 degrees because the typical glass panel is attached to the wall(s) (See FIG. 1) at a 90 degree angle. Other elbow angles are possible, as will be readily realized by persons skilled in the art, to satisfy particular configurations of shower stalls or other applications. Whatever elbow angle is chosen for attaching the glass panels, that angle will generally be duplicated in the elbow angle formed in the support bar at location 54 in order to maintain alignment. It will also be appreciated that the elbow angle may be realized in a variety of ways such as by bending the bar stock used to fabricate the support bar 47 or by joining two or more separate pieces of bar stock together. Further, the bar 47 may have other cross-sections than the round one shown in the illustrated embodiment. The radius of the elbow angle bend or joint is not critical, it being limited primarily by the space available for the installation of the support bar assembly, aesthetic considerations and possible utilitarian aspects of features that may be incorporated into the support bar assembly such as towel racks, receptacles for soap or other articles or as a support for hanging receptacles or other items.

Continuing with FIG. 2, the support bar assembly 41 includes first and second mounting assemblies. A second mounting assembly includes a wall mounting plate 57, mounting plate screws 65 (four pieces in this example), for securing the wall mounting plate 57 to the walls 13, 15, and a wall cover plate 67. The wall mounting plate 57 includes an externally threaded flange portion 61 and an internally threaded portion 59, both oriented along the common longitudinal axis 45. The flange portion 61 includes a plurality of mounting holes 63, three of the four used in this illustrative example being shown in FIG. 2. The threads on the externally threaded portion of the wall mounting plate 57 have a pitch and diameters that are configured to receive a similarly threaded wall cover plate 67 to be described. The internally threaded portion has the same pitch and diameter threads as the threads 53 on the second end 51 of support bar 47 so that the wall mounting plate may be installed thereon. The wall mounting plate 57 may be fabricated of metal or plastic materials by ordinary machining or molding processes well-known to persons skilled in the industrial arts.

Before the wall mounting plate 57 is threaded on the support bar, a top-hat-shaped wall cover plate 67 is slipped over the second end of the second arm 51 of the support bar 47. The wall cover plate 67 may be drawn or stamped or molded of metal and includes a hole 73 in the "crown" portion to permit slipping it over the second arm 51 of the support bar 47. At the other end of the wall cover plate 67 is a "brim" portion having a wider diameter flange-shaped portion to conceal the wall mounting plate 57 upon installation. Internal threads 71 within the inside diameter of the "brim" of the top-hat-shaped wall cover plate 67 are configured to be screwed on the external threads of the wall mounting plate 57.

Continuing with FIG. 2, a first mounting assembly includes a disc-shaped, adjustable back plate 75 that has a hex nut 77 formed on the side shown in the figure. The hex nut 77 is provided to enable turning of the adjustable back plate while adjusting the position of the glass panel 23, 25 during installation. The threaded hole 79 of the hex nut 77 passes fully through the adjustable back plate 75. The pitch and diameters of the internal threads of hole 79 match the threads 53 on the first end of the first arm 49 of the support bar 47. The external threads 81 around the perimeter of the adjustable back plate 75 have a pitch and diameters for receiving the matching threads 87 of the back plate cover 83. Back plate cover 83 is formed to a shape and dimensions similar to the wall cover plate 67 described previously and serves the same function of covering the structural portion of the respective mounting assembly to provide a decorative appearance. In some embodiments the length along the longitudinal axis 43 of the adjustable back plate 75 may be smaller than the corresponding length of the wall cover plate 67 because the adjustable back plate 75 may be more compact in the direction of the longitudinal axis 43.

Continuing with FIG. 2, an outside cap 91 is shown. The outside cap 91 is essentially a screw with threads 93 and having an enlarged "head" of the same diameter as the diameter of the outer circumference of the "brim" portion 89 of the back plate cover 83. The threads 93 of outside cap 91 have a pitch and diameters that match the threads 55 in the end of first end 49 of the support bar 47. The threaded portion 93 of the outside cap 93 are passed through a hole in the glass panel 23, 25 to secure the first end of the first arm 49 of the support bar 47 to the glass panel 23, 25. The perimeter of the "head" of the outside cap (screw) 91 may be finished with a smooth surface as shown or a knurled surface to better facilitate gripping the outside cap 91 while turning its threaded portion 93 into the threaded hole 55 in the end of the first arm 49 of the support bar 47. The outside surface of the outside cap 91 may be finished or decorated as desired or, in some applications, the outside cap 91 may include, e.g., a hook for hanging a towel or other item.

Installation of the components of the support bar assembly 41 provided as shown in FIG. 2 in a shower stall 11 (see FIG. 1) may proceed as follows. Install the glass panel 23 or 25 upon the mounting surface, the fixed wall 13 or 15, making sure the panel is plumb and properly located with respect to the fixed wall and the floor of the shower stall. Assemble the first mounting assembly comprising the back plate cover 83 and the adjustable back plate 75, in that order, over the first arm 49 of the support bar 47. Insert the threads 53 of the first end 49 into a pre-drilled hole in the glass panel 23, 25 at the desired location (see, e.g., FIG. 1) near the unsupported edge of the glass panel 23, 25. Note that the pre-drilled hole location should be carefully positioned relative to the fixed wall surface to which the glass panel 23 or 25 is attached. The distance from the wall 13, 15 to the pre-drilled hole should match the length of the support bar which will be installed. After inserting the threaded end of the first arm 49 of the support bar 47 into the pre-drilled hole, turn the adjustable back plate 75 on the threads 53 of the support bar 47 until the adjustable back plate 75 just contacts the surface of the glass panel 23, 25. Install the outside cap 91 by threading the screw threads 93 into the hole 55 in the end of the first arm 49 of the support bar 47 until the outside cap 91 is against, but not tightened upon, the outside surface of the glass panel 23, 25. Leave the back plate cover 83 loose on the support bar 47 until later.

Continuing with the installation of the support bar assembly of FIG. 2, assemble the second mounting assembly comprising the wall cover plate 67 followed by the wall mounting plate 57 over the second arm 51 of the support bar 47. Place the support bar 47 in position, perpendicular with and against the surface of the wall 13, 15 so that the glass panel 23, 25 being installed is at the desired pre-determined angle (90 degrees in this example) to the wall 13, 15, the support bar is level and the glass panel 23, 25 is plumb. Mark the location of the holes for the mounting screws 65 and drill them in the wall 13, 15. Align the mounting holes 63 in the wall mounting plate 57 with the holes drilled into the wall 13, 15 and insert the mounting screws 65, tightening them evenly and snugly. Rotate the wall cover plate 67 onto the threads 61 of the wall mounting plate 57 until the cover plate 67 fits snugly against the wall 13, 15. Recheck the alignment of the glass panel 23, 25 and trim its position by loosening the outside cap 91 and turning the hex nut 77 on the adjustable back plate 75 with an open end wrench. There may be some situations when the glass panel 23, 25 alignment is not correct, e.g., the glass panel 13, 15 is not at the correct predetermined angle with respect to the fixed wall 13, 15. In such cases, the mounting plate screws 65 may be removed and the wall mounting plate 57 rotated in one or more increments of a quarter turn each, the screws 65 reinstalled, and the angle rechecked. The glass panel 23, 25 is properly trimmed when the stabilized glass panel is plumb and the reveals (gaps or visible edges) between the glass panel and a door panel or other adjacent panels are even, without introducing bending or twisting stress upon the glass panel 23, 25. Then, tighten the outside cap 91 against the outside surface of the glass panel 23, 25. In an alternate embodiment of the invention, resilient gaskets (not shown) may be installed between the glass panel 23, 25 and the mounting plates 67, 83 or the outside cap 91. Such gaskets may provide a snug, secure fit without excessive tightening by distributing the clamping forces provided by the mounting assemblies more evenly.

Figure 3:
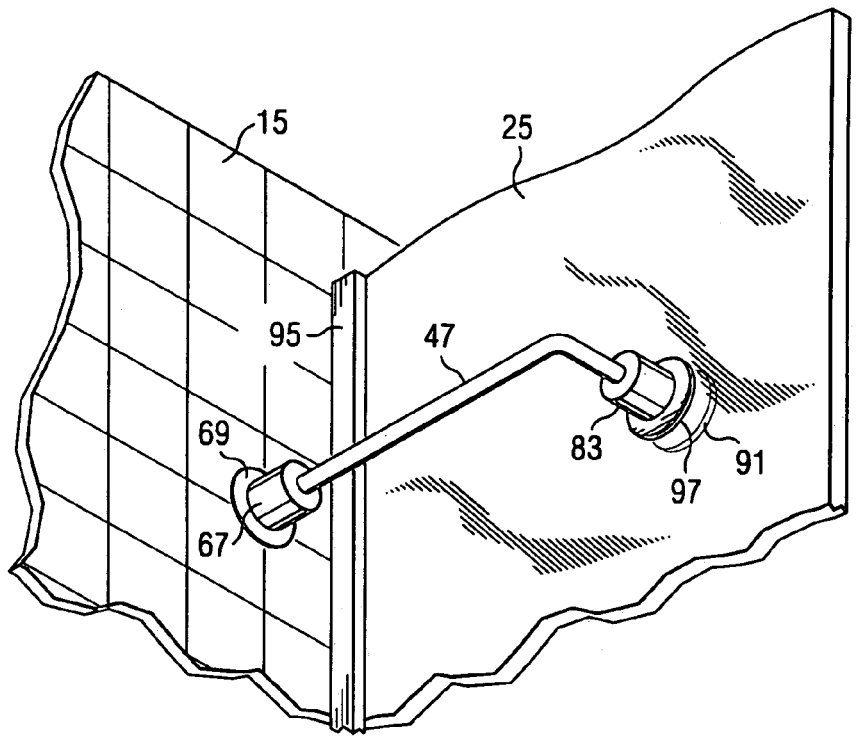
FIG. 3 illustrates a perspective view of the support bar assembly of FIG. 2 as installed on a glass panel of the shower stall enclosure according to the present invention.

Referring to FIG. 3, there is illustrated a perspective view of the support bar assembly of FIG. 2 as installed on a glass panel 25 of the shower stall 11 enclosure according to the present invention. The glass panel 25 is attached to the wall 15 by the frame 95. The support bar assembly 41 is shown as installed, the visible parts being the support bar 47, the cover plates 67 and 83 and the outside cap 91 (in phantom). The cover plates 67 (including the "brim" portion 69) and 83 conceal the mounting plates 57 and 75, respectively. The darkened region between the cover plate 83 and the outside cap 91 represents the space occupied by the glass panel 25 plus any gaskets (not shown) if they are used.

Figure 4:
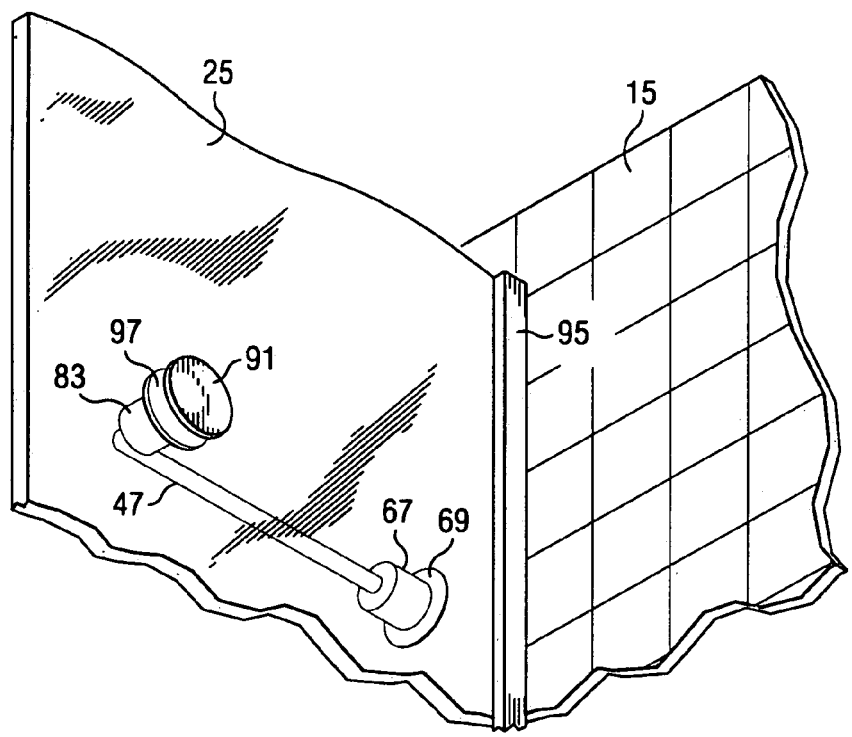
FIG. 4 illustrates a phantom perspective view of the support bar assembly of FIG. 3 from the opposite side of the glass panel of FIG. 3.

Referring to FIG. 4, there is illustrated a phantom perspective view of the support bar assembly of FIG. 3 from the opposite side of the glass panel 25 of FIG. 3. The detailed description for FIG. 3 also applies to FIG. 4, except that all of the support bar assembly (except the outside cap 91) is shown in phantom view.

Figure 5:
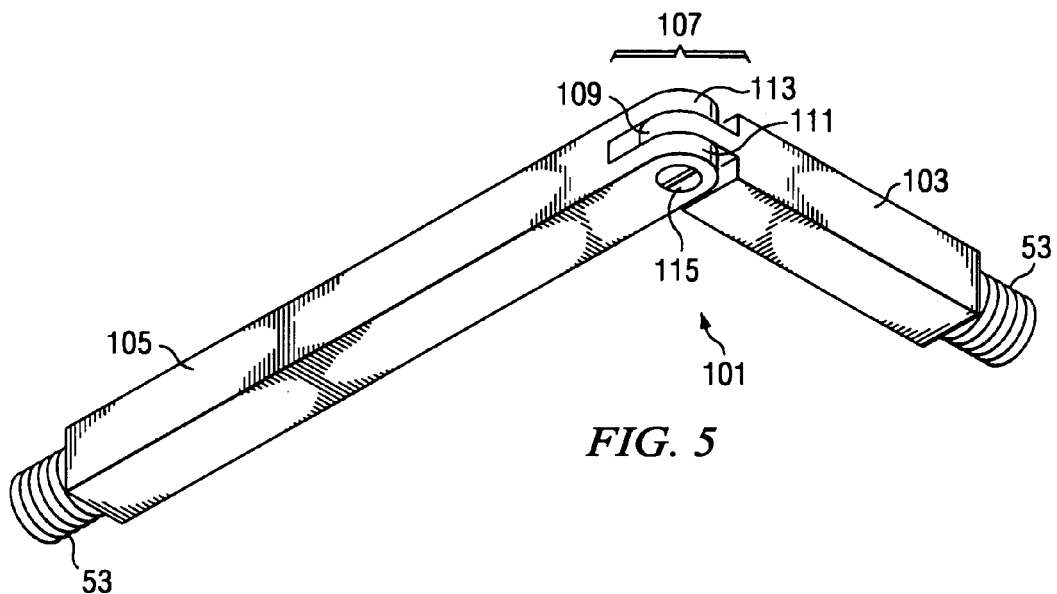
FIG. 5 illustrates an alternate embodiment of the support bar shown in FIG. 2.

In an alternate embodiment of a support bar assembly 101, a knuckle joint 107 is disposed along the support bar in the location of the elbow angle, as shown in FIG. 5. The knuckle joint pivots about an axis that is generally parallel to both the thin panel and the fixed mounting surface. The pivot may comprise a set screw 115 for loosening to allow movement of the first and second arms 103, 105 of the support bar to adjust the angle there between and for tightening to clamp the first and second arms of the support bar to maintain the desired angle. The knuckle joint 107 thus allows fine adjustments in the support arm assembly 101 when the predetermined angle is not exactly a right angle or to set the support bar angle at a non-standard angle.

Figure 6:
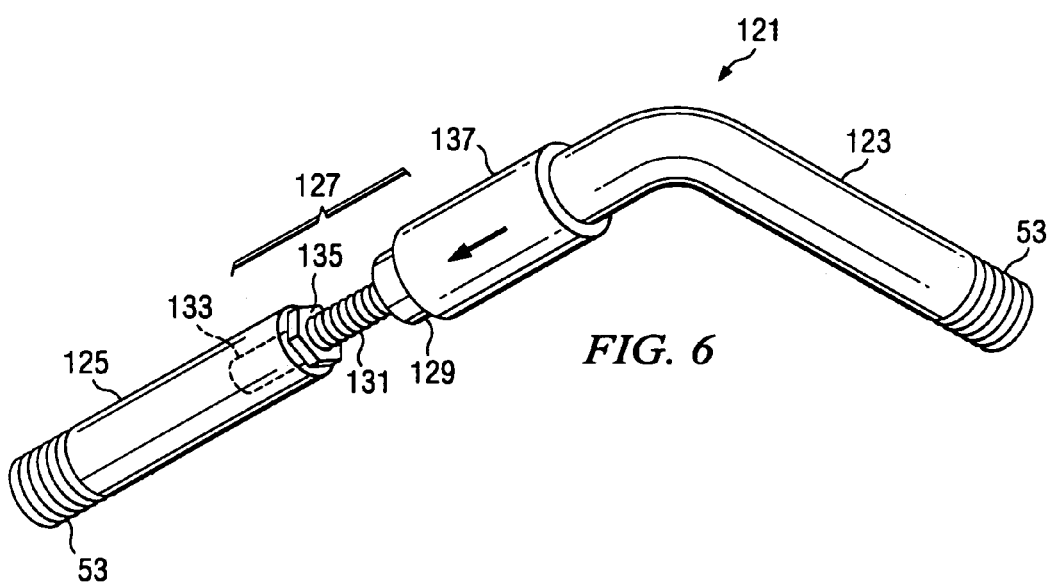
FIG. 6 illustrates another alternate embodiment of the support bar shown in FIG. 2.

In another alternative embodiment of a support bar assembly 121 having a first arm 123 and a second arm 105 shown in FIG. 6, the second, longer arm 125 of the support bar may include a length-adjustable segment 127 to enable adjusting the support bar to more closely fit the distance from the fixed mounting surface to the attachment location on the thin panel. In the illustrative embodiment of FIG. 6, the first arm 123 includes an elbow angle and coupling 137, shaft support 129, and a smaller-diameter threaded shaft 131 and a lock nut 135. The second arm 125 includes a threaded hole in the end opposite the first end (which has threads 53, as previously described). The length of the second arm 125 is adjusted by turning the second arm 125 on the threaded shaft 131, inserted into threaded hole 133, then tightening the lock nut 135 against the end of the second arm 125. This operation may be done during installation, without having to remove the second mounting assembly.

While the invention has been fully described with respect to one of its forms and several alternate embodiments, it is not thus limited but is susceptible to various changes and modifications without departing from the spirit thereof. For example, persons skilled in the art will readily appreciate that the support bar assembly according to the present invention may also be installed on the outside of the glass panels 23, 25 of the illustrated embodiments with no loss of functionality. Similarly, the glass panels 23, 25, with which the invention may be used, may be transparent, translucent or opaque, or fabricated of materials other than glass such as plastics, metals, wood or composites, also without loss of functionality. The thin panels may be rigid, e.g., when made of glass or non-rigid, as when made of metal or plastic, for example. In some cases these alternate embodiments may provide additional utility or decorative advantages without departing from the spirit of the invention. Further, applications are not limited to shower stalls, which is merely an illustrative embodiment utilized in the present description to demonstrate the principles of the invention.

Generally, the invention is applicable in any context where a thin panel is attached along one edge to a fixed mounting surface and it is desired to support and/or stabilize the edge opposite or away from the attached edge. The fixed mounting surface may be vertical or horizontal or disposed at some other angle with respect to a reference mounting surface. The mounting surface is fixed in the sense of being stiff and unyielding when a thin, rigid panel is attached to and supported by it. The mounting surface may be flat or curved and part of a structure that is stationary or not stationary. Further, the mounting surface may be a thin, rigid panel that meets the criteria set forth herein. Thus, a variety of mounting surfaces are suitable for utilizing the support bar assembly of the present invention to support and/or stabilize a thin panel thereon.

What is claimed is:

1. A support arm assembly for stabilizing an outward, distal portion of a thin, rigid panel attached at an inward, mounted edge opposite the outward, distal portion to a fixed mounting surface, comprising:

a support bar having externally threaded first and second ends of respective first and second arms joined at an elbow angle nearer the first end of the first arm that is adapted to be substantially equal to a predetermined panel angle between the thin panel and the fixed, mounting surface;

a first mounting assembly installed on the first end of the support bar for attaching the first end of the support bar to the thin panel at a first location thereon; and a second mounting assembly installed on the second end of the support bar for attaching the second end of the support bar to the fixed, mounting surface at a second location thereon;

wherein the externally threaded first and second ends of the respective first and second arms of the support bar enable adjustment of the first and second mounting assemblies respectively along a longitudinal axis of each first and second arm of the support bar to stabilize the outward, distal portion of the thin panel at the predetermined panel angle;

wherein the first mounting assembly comprises:

a first mounting plate;

a first cover for concealing the first mounting plate; and an outside cap for securing the first end of the support bar to the thin panel;

wherein the first mounting plate comprises:

a circular disk, having a first diameter, first and second sides and a center, and a round hole formed through the center of the circular disk for receiving the first arm of the support bar, flat on the first side and formed with a raised, hexagonal nut portion axially aligned with the center of the circular disk on the second side;

wherein a plurality of external screw threads are disposed around a perimeter of the circular disk and a plurality of internal screw threads matching the pitch and diameters of the external threads on the first end of the support bar are disposed within the bore through the circular disk.

2. The support arm assembly of claim 1, wherein the first cover comprises:

a top-hat-shaped cover having a crown portion and a brim portion and formed about a central axis;

wherein a plurality of internal screw threads, of pitch and diameters to match threads provided around the perimeter of the first mounting plate, are formed inside the crown portion of the first cover, and a hole for receiving the first arm of the support bar there through is formed in the crown portion centered on the central axis of the first cover.

3. The support arm assembly of claim 1, wherein the outside cap comprises:

a machine screw having a threaded shank and a disk-shaped head having a diameter approximately equal to a first diameter of the first cover;

wherein screw threads on the threaded shank match a plurality of internal screw threads within a hole formed in the first end of the support bar along the longitudinal axis of the first arm of the support bar.

4. The support arm assembly of claim 1, wherein the second mounting assembly comprises:

a second mounting plate, a plurality of mounting screws for securing the second mounting plate to the fixed mounting surface and a second cover for concealing the second mounting plate.

5. The support arm assembly of claim 4, wherein the second mounting plate comprises:

a cylindrical body portion having an internally threaded axial bore there through and a circular flange portion disposed about and unified with a first end of the body portion;

wherein a plurality of external screw threads are disposed around a perimeter of the circular flange portion; and wherein a plurality of mounting holes are uniformly disposed through the flange portion around and parallel to the axial bore.

6. The support arm assembly of claim 4, wherein the second cover comprises:

a top-hat-shaped cover having a crown portion and a brim portion and formed about a central axis;

wherein a plurality of internal screw threads, of pitch and diameters to match the threads around the perimeter of the second mounting plate, are formed inside the crown portion of the first cover, and a hole for receiving the second arm of the support bar there through is formed in the crown portion centered on the central axis of the second cover.

7. The support arm assembly of claim 1, wherein the predetermined angle is substantially a right angle.

8. The support arm assembly of claim 1, wherein the predetermined angle is other than substantially a right angle.

* * * * *